US007725241B2

(12) United States Patent
Ikeda

(10) Patent No.: US 7,725,241 B2
(45) Date of Patent: May 25, 2010

(54) FUEL INJECTION CONTROL DEVICE AND FUEL INJECTION SYSTEM USING THE SAME

(75) Inventor: Takashi Ikeda, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 12/186,773

(22) Filed: Aug. 6, 2008

(65) Prior Publication Data

US 2009/0055082 A1 Feb. 26, 2009

(30) Foreign Application Priority Data

Aug. 23, 2007 (JP) ............................ 2007-217161

(51) Int. Cl.
*B60T 7/12* (2006.01)
*F02D 31/00* (2006.01)

(52) U.S. Cl. ...................... 701/103; 123/359; 123/479; 123/690

(58) Field of Classification Search ................ 123/359, 123/357, 479, 198 D, 690, 494, 436; 701/103, 701/104, 105
See application file for complete search history.

(56) References Cited

U.S. PATENT DOCUMENTS 5,723,780 A * 3/1998 Miwa et al. .............. 73/114.43
6,474,294 B2 * 11/2002 Yamazaki et al. ........... 123/295
6,971,368 B2 12/2005 Uchiyama
2005/0103312 A1 * 5/2005 Uchiyama .................. 123/457
2006/0144365 A1 * 7/2006 Miyashita .................. 123/431

* cited by examiner

*Primary Examiner*—John T Kwon
(74) *Attorney, Agent, or Firm*—Nixon & Vanderhye P.C.

(57) ABSTRACT

When an ignition key is switched off, an updated learning value is set as an immediately preceding learning value of a present trip, which is compared with an average value of start timing learning values in a predetermined number of trips up to and including the present trip. When a difference between the immediately preceding learning value of the present trip and the average value exceeds a predetermined range, a start timing learning value to be used at a startup of a next trip is not updated. When the difference between the immediately preceding learning value of the present trip and the average value fails within the predetermined range, the immediately preceding learning value of the present trip is written in an EEPROM and used as the start timing learning value at the engine startup of the next trip.

18 Claims, 4 Drawing Sheets

FUEL INJECTION CONTROL DEVICE AND FUEL INJECTION SYSTEM USING THE SAME

CROSS REFERENCE TO RELATED APPLICATION

This application is based on and incorporates herein by reference Japanese Patent Application No. 2007-217161 filed on Aug. 23, 2007.

BACKGROUND OF THE INVENTION

1. Field of the Invention

The present invention relates to a fuel injection control device that adjusts a pumping quantity of a fuel supply pump with a metering valve and to a fuel injection system using the fuel injection control device, the fuel supply pump supplying fuel to an injector of an internal combustion engine.

2. Description of Related Art

There is conventionally known a technology of adjusting a pumping quantity of a fuel supply pump, which supplies fuel to an injector of an internal combustion engine, with a metering valve to control pressure of the fuel supplied to the injector. The metering valve is electromagnetically driven by current or the like to adjust the pumping quantity of the fuel supply pump. If a current value for driving the metering valve changes, the pumping quantity of the fuel supply pump changes.

The pumping quantity of the fuel supply pump varies due to an individual difference or aging of the fuel supply pump and the like. Therefore, it is preferable to calculate a learning value for controlling a drive amount of the metering valve based on a deviation between pressure of fuel supplied to the injector and target fuel pressure during one trip from an operation start to an operation end of the internal combustion engine and to control the drive amount with the learning value to approximate actual fuel pressure to the target fuel pressure (for example, as described in JP-A-2005-147005).

When the internal combustion engine is started in a next trip, the learning value learned in the present trip can be used as a start timing learning value for controlling the drive amount of the metering valve at a startup of the next trip.

In a case where an event that has caused the learning of the drive amount of the metering valve during the present trip is specific to the present trip, the event as the cause of the learning has been solved by the time of the engine startup of the next trip in some cases. For example, in some cases, a sliding failure of a sliding portion of the metering valve or deterioration of fuel properties during the present trip has been improved by the time of the engine startup of the next trip.

If the learning value of the present trip is used as the start timing learning value of the next trip in such the state, there is a possibility that when the drive amount of the metering valve is learned to excessively reduce the pumping quantity of the fuel supply pump in the present trip, the pumping quantity of the fuel supply pump is reduced at the startup of the next trip and eventually injection pressure of the injector falls excessively below the target injection pressure, causing an engine startup failure, for example.

If the drive amount of the metering valve is learned to excessively increase the pumping quantity of the fuel supply pump in the present trip, there is a possibility that the pumping quantity of the fuel supply pump at the startup of the next trip increases and eventually the injection pressure of the injector becomes excessively higher than the target injection pressure, causing a large combustion noise.

SUMMARY OF THE INVENTION

It is an object of the present invention to provide a fuel injection control device capable of inhibiting a rapid change of a learning value for controlling a drive amount of a metering valve at a startup of an internal combustion engine and a fuel injection system using the fuel injection control device.

According to an aspect of the present invention, when a difference between an immediately preceding learning value, which is learned under a learning condition immediately before an end of a present trip and used for controlling a drive amount of a metering valve, and an average value of immediately preceding learning values in a predetermined number of trips up to and including the last trip exceeds a predetermined range, a fuel injection control device updates a start timing learning value for controlling the drive amount of the metering valve at a startup of a next trip with the average value of the immediately preceding learning values in the predetermined number of trips up to and including the last trip.

That is, when the immediately preceding learning value of the present trip is excessively away from the average value of the immediately preceding learning values in the predetermined number of trips up to and including the last trip because of an occurrence of an unexpected event specific to the present trip, the immediately preceding learning value of the present trip is not used as the start timing learning value of the next trip but the average value of the immediately preceding learning values in the predetermined number of trips up to and including the last trip is used as the start timing learning value.

Thus, in a case where the unexpected event specific to the present trip has been solved by the time of the startup of the next trip, the start timing learning value of the next trip can be prevented from changing rapidly with respect to the start timing learning values of the trips up to and including the present trip. Accordingly, the pumping quantity of the fuel supply pump at the startup of the internal combustion engine in the next trip can be prevented from rapidly increasing or decreasing from the pumping quantity at the startup of each of the trips up to and including the present trip.

The pressure of fuel supplied to the injector changes with the pumping quantity of the fuel supply pump. Therefore, by preventing the pumping quantity of the fuel supply pump at the startup of the next trip from rapidly increasing or decreasing as compared to the pumping quantity at the startup of each of the trips up to and including the present trip as described above, injection pressure of the injector in the next trip can be prevented from rapidly increasing or decreasing as compared to the injection pressure at the startup of each of the trips up to and including the present trip. As a result, a startup failure of the internal combustion engine in the next trip can be inhibited and also deterioration of the combustion noise at the startup can be inhibited.

According to another aspect of the present invention, a fuel injection control device does not update a start timing learning value for controlling a drive amount of a metering valve at a startup of a next trip when a difference between an immediately preceding learning value, which is learned under a learning condition immediately before an end of a present trip and used for controlling the drive amount of the metering valve, and an average value of immediately preceding learning values in a predetermined number of trips up to and including the last trip exceeds a predetermined range.

That is, in a case where the immediately preceding learning value of the present trip is excessively away from the average value of the immediately preceding learning values in the predetermined number of trips up to and including the last trip because of an occurrence of an unexpected event specific to the present trip, the immediately preceding learning value of the present trip is not used as the start timing learning value for controlling the drive amount of the metering valve at the startup of the next trip. Instead, for example, the start timing learning value used at the startup of the present trip is used as the start timing learning value of the next trip.

Thus, in a case where the unexpected event specific to the present trip has been solved by the time of the startup of the next trip, the rapid change of the start timing learning value used at the startup of the next trip can be prevented. Therefore, the pumping quantity of the fuel supply pump at the startup of the internal combustion engine in the next trip can be prevented from rapidly increasing or decreasing as compared to the pumping quantity at the startup of each of the trips up to and including the present trip. As a result, injection pressure of the injector in the next trip can be prevented from rapidly increasing or decreasing as compared to the injection pressure at the startup of each of the trips up to and including the present trip. Accordingly, a startup failure of the internal combustion engine in the next trip can be inhibited and also the deterioration of the combustion noise at the startup can be inhibited.

According to the above aspects of the present invention, when the difference between the immediately preceding learning value of the present trip and the average value of the immediately preceding learning values of the predetermined number of trips up to and including the last trip falls within the predetermined range, the start timing learning value of the next trip is updated with the immediately preceding learning value of the present trip.

Thus, the injection pressure of the injector in the next trip can be prevented from rapidly increasing or decreasing as compared to the injection pressure at the startup of each of the trips up to and including the present trip. Further, the latest value of the immediately preceding learning value changing with aging or the like can be used to start the internal combustion engine in the next trip. As a result, the startup failure of the internal combustion engine in the next trip can be inhibited and also the deterioration of the combustion noise at the startup can be inhibited.

According to another aspect of the present invention, the immediately preceding learning value of the present trip is compared with an average value of immediately preceding learning values in the predetermined number of trips, in which the start timing learning values are updated, among immediately preceding learning values of multiple trips up to and including the last trip.

That is, among the immediately preceding learning values as candidates for the calculation of the average value to be compared with the immediately preceding learning value of the present trip, the immediately preceding learning value that changes so rapidly that a difference between the immediately preceding learning value and an average value of immediately preceding learning values in the predetermined number of immediately preceding trips exceeds a predetermined range is excluded from the calculation candidates of the average value to be compared with the immediately preceding learning value of the present trip.

Thus, the average value to be compared with the immediately preceding learning value of the present trip is calculated from the immediately preceding learning values gradually changing between the trips except for the immediately preceding learning value that is outlying because of an occurrence of an unexpected event specific to the trip in the trips up to and including the last trip. As a result, rapid change of the start timing learning value used at the startup of the next trip can be prevented. Accordingly, the pumping quantity of the fuel supply pump at the startup of the internal combustion engine in the next trip can be prevented from rapidly increasing or decreasing as compared to the pumping quantity at the startup of each of the trips up to and including the present trip.

According to another aspect of the present invention, when a difference between an immediately preceding learning value of a present trip and an average value of start timing learning values of a predetermined number of trips up to and including the present trip exceeds a predetermined range, a fuel injection control device does not update a start timing learning value of a next trip.

That is, in a case where the immediately preceding learning value of the present trip is excessively away from the average value of the start timing learning values in the predetermined number of trips up to and including the present trip because of an occurrence of an unexpected event specific to the present trip, the immediately preceding learning value of the present trip is not used as the start timing learning value of the next trip. Instead, for example, the start timing learning value used at the startup of the present trip is used as the start timing learning value of the next trip.

Accordingly, in a case where the unexpected event specific to the present trip has been solved by the time of the startup of the next trip, the rapid change of the start timing learning value used at the startup of the next trip can be prevented. Thus, the pumping quantity of the fuel supply pump at the startup of the internal combustion engine in the next trip can be prevented from rapidly increasing or decreasing as compared to the pumping quantity at the startup of each of the trips up to and including the present trip. As a result, the injection pressure of the injector in the next trip can be prevented from rapidly increasing or decreasing as compared to the injection pressure at the startup of each of the trips up to and including the present trip. Therefore, the startup failure of the internal combustion engine in the next trip can be inhibited and also the deterioration of the combustion noise at the startup can be inhibited.

According to this aspect of the present invention, the fuel injection control device updates the start timing learning value of the next trip with the immediately preceding learning value of the present trip when the difference between the immediately preceding learning value of the present trip and the average value of start timing learning values in the predetermined number of trips up to and including the present trip is within the predetermined range.

Thus, the injection pressure of the injector in the next trip can be prevented from rapidly increasing or decreasing as compared to the injection pressure at the startup of each of the trips up to and including the present trip. Further, the latest value of the immediately preceding learning value changing with aging or the like can be used to start the internal combustion engine in the next trip. As a result, the startup failure of the internal combustion engine in the next trip can be inhibited and also the deterioration of the combustion noise at the startup can be inhibited.

According to another aspect of the present invention, a fuel injection control device updates a start timing learning value of a next trip with an average value of an immediately preceding learning value of a present trip and start timing learning values of a predetermined number of trips up to and including the present trip.

Thus, even if the immediately preceding learning value of the present trip is excessively away from the start timing learning values in the predetermined number of trips up to and including the present trip because of an occurrence of an unexpected event specific to the present trip, rapid change in the start timing learning value used at the startup of the next trip can be prevented more effectively than in the case of updating the start timing learning value of the next trip with the immediately preceding learning value of the present trip. As a result, the injection pressure at the startup of the internal combustion engine in the next trip can be prevented from rapidly increasing or decreasing as compared to the injection pressure at the startup of the internal combustion engine in each of trips up to and including the present trip and therefore, the internal combustion engine can be started with appropriate injection pressure. Accordingly, the startup failure of the internal combustion engine in the next trip can be inhibited and also the deterioration of the combustion noise at the startup can be inhibited.

According to another aspect of the present invention, the fuel injection control device uses a state where the internal combustion engine is performing an idling operation as a learning condition for learning the drive amount of the metering valve.

Thus, the state where the internal combustion engine is performing the idling operation, in which there are few disturbances increasing/decreasing actual fuel pressure other than the pumping quantity of the fuel supply pump, is used as the learning condition of the drive amount of the metering valve. Accordingly, the actual fuel pressure can be acquired with high accuracy. In consequence, the drive amount of the metering valve can be learned with high accuracy based upon a deviation of the actual fuel pressure from the target fuel pressure.

According to another aspect of the present invention, the fuel pumped by the fuel supply pump is accumulated in a common rail and supplied to the injector, and a pressure acquiring device acquires pressure in the common rail as pressure of the fuel supplied from the fuel supply pump to the injector.

According to yet another aspect of the present invention, a fuel injection system includes a fuel supply pump having a metering valve for adjusting a pumping quantity of fuel pressurized and pumped by the fuel supply pump, a common rail for accumulating the fuel pumped by the fuel supply pump, an injector for injecting the fuel accumulated in the common rail to a cylinder of an internal combustion engine, and the fuel injection control device according to the immediately preceding aspect of the present invention.

Each function of multiple sections according to the aspects of the present invention is achieved by a hardware source having a function specified by a construction thereof, a hardware source having a function specified by a program, or a combination of such the hardware sources. The respective functions of the multiple sections are not limited to the functions achieved by the hardware sources that are physically independent from each other.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Hereafter, embodiments of the present invention will be explained with reference to the drawings.

Figure 1:
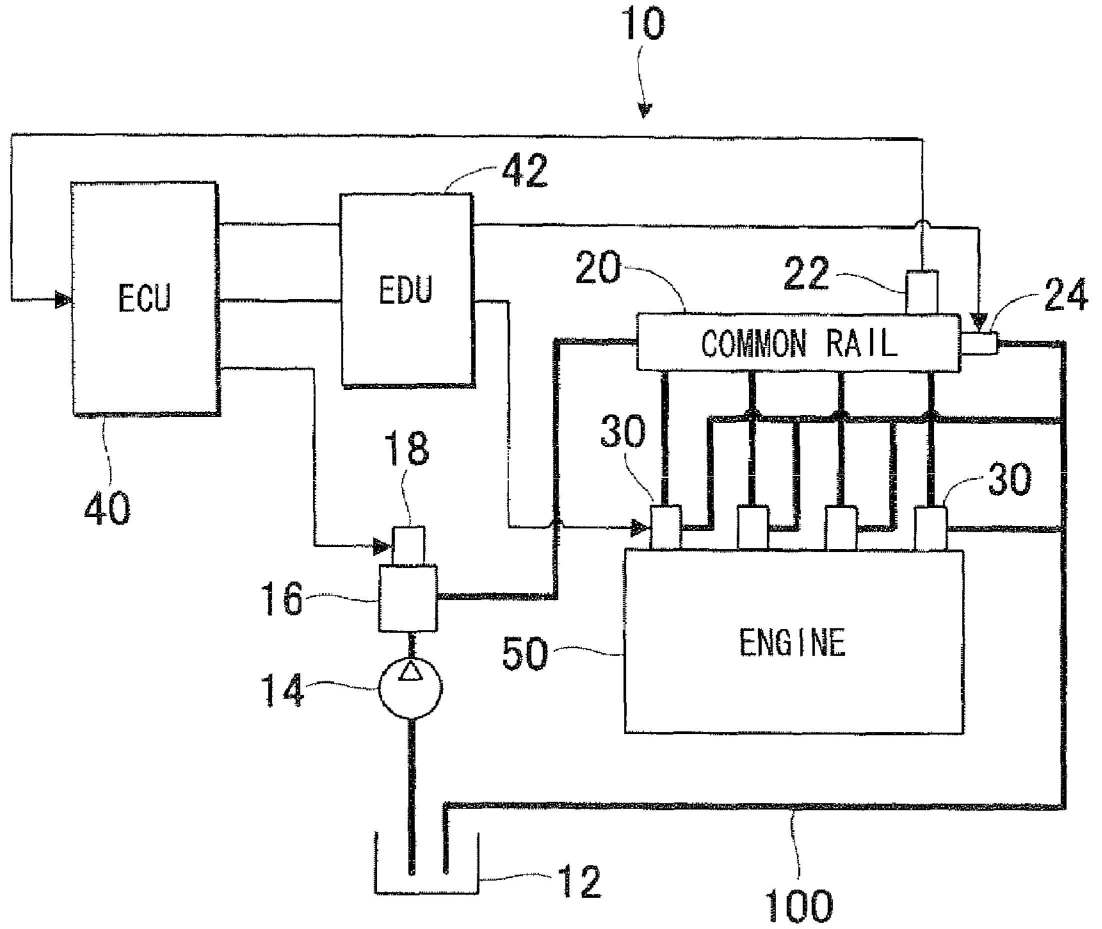
FIG. 1 is a block diagram showing a fuel injection system according to a first embodiment of the present invention.

FIG. 1 shows a fuel injection system according to a first embodiment of the present invention. A pressure accumulation fuel injection system 10 according to the present embodiment includes a fuel feed pump 14, a high-pressure pump 16, a common rail 20, a pressure sensor 22, a pressure reducing valve 24, injectors 30, an electronic control unit 40 (ECU), an electronic driving unit 42 (EDU) and the like. The system 10 injects fuel to cylinders of a four-cylinder diesel engine 50. For avoiding complication of the drawing, FIG. 1 shows only one control signal line extending from the EDU 42 to one injector 30.

The fuel feed pump 14 suctions fuel from a fuel tank 12 and feeds the fuel to the high-pressure pump 16 as a fuel supply pump. The high-pressure pump 16 is a known pump, in which a plunger reciprocates with rotation of a cam of a camshaft to pressurize the fuel suctioned into a pressurization chamber.

A metering valve 18 is arranged in a fuel passage between a fuel inlet and the pressurization chamber of the high-pressure pump 16. The metering valve 18 is an electromagnetic valve, whose opening area for suctioning the fuel into the pressurization chamber changes in accordance with a value of supplied current. The ECU 40 adjusts a duty ratio to control the current value as a drive amount for driving the metering valve 18. The ECU 40 controls the current value supplied to the metering valve 18 of the high-pressure pump 16 to regulate a fuel suction quantity suctioned by the high-pressure pump 16 during a suction stroke. Thus, by regulating the fuel suction quantity, a fuel pumping quantity of the high-pressure pump 16 is regulated.

The common rail 20 accumulates the fuel pumped by the high-pressure pump 16 and holds fuel pressure at predetermined high pressure according to an engine operation state. The fuel pressure in the common rail 20 (hereinafter, referred to as common rail pressure) is controlled with the pumping quantity of the high-pressure pump 16 and the pressure reducing valve 24. The pressure sensor 22 as a pressure sensing device senses the fuel pressure in the common rail 20 and outputs the sensed fuel pressure to the ECU 40.

The pressure reducing valve 24 as a pressure reducing device opens to discharge the fuel in the common rail 20 to a return pipe 100 on a low-pressure side, thereby reducing the common rail pressure. For example, the pressure reducing valve 24 is a known electromagnetic valve, in which a spring applies a load to a valve member in a valve-closing direction. When an electromagnetic drive section of the pressure reducing valve 24 such as a coil is energized, the valve member lifts against the load of the spring and thus the pressure reducing valve 24 opens. A valve-opening time of the pressure reducing valve 24 changes in accordance with a pulse width (an energization time) of an energization pulse supplied to the pressure reducing valve 24.

The injectors 30 are arranged in the respective cylinders of the four-cylinder diesel engine 50 and inject the fuel accumulated in the common rail 20 into the cylinders. Each injector 30 performs a multistage injection (i.e., multi-injection)

including a pilot injection, a main injection and a post-injection during one combustion stroke of the diesel engine. The injector 30 is a known electromagnetically driven valve that controls a fuel injection quantity by controlling pressure in a control chamber applying fuel pressure to a nozzle needle in a valve-closing direction.

The ECU 40 as a fuel injection control device is constituted by a microcomputer including CPU, ROM, RAM and a rewritable nonvolatile memory such as EEPROM as main components. The ECU 40 acquires an operation state of the diesel engine 50 from sensing signals of various sensors such as an accelerator sensor for sensing an accelerator position (ACC), a temperature sensor, the pressure sensor 22, an NE sensor for sensing engine rotation speed (NE) and an A/F sensor. The ECU 40 controls energization to the metering valve 18, the pressure reducing valve 24, the injectors 30 and the like based upon the acquired engine operation state to control the diesel engine 50 to an optimal operation state.

The ECU 40 stores a pumping quantity characteristic of the pumping quantity of the high-pressure pump 16 with respect to the duty ratio of the current value for driving the metering valve 18 as a map in the storage device such as the ROM or the EEPROM. The ECU 40 performs feedback-control of the energization to the metering valve 18 based upon the pumping quantity characteristic of the high-pressure pump 16 stored in the storage device to conform actual common rail pressure acquired from the pressure sensor 22 to target common rail pressure.

The ECU 40 controls injection timing and an injection quantity of the injector 30 in accordance with the engine operation state acquired from the various sensors including the pressure sensor 22. The ECU 40 outputs a pulse signal as an injection command signal for controlling the injection timing and the injection quantity of the injector 30 to the EDU 42. The ECU 40 stores an injection quantity characteristic of the injection quantity with respect to the pulse width of the injection pulse signal as a map for each common rail pressure as the injection pressure in the aforementioned storage device.

The EDU 42 is a drive device for supplying drive currents or drive voltages to the pressure reducing valve 24 and the injectors 30 based upon control signals outputted by the ECU 40.

The ECU 40 functions as each of following sections according to control programs stored in the storage device such as the ROM or the EEPROM.

(1) Learning Condition Determining Section:

The ECU 40 defines a state where the engine 50 is performing an idling operation as a learning condition of the current value as the drive amount of the metering valve 18.

(2) Pressure Acquiring Section:

The ECU 40 acquires the fuel pressure in the common rail 20 from the sensing signal of the pressure sensor 22.

(3) Learning Section:

The ECU 40 learns a control amount for performing the feedback-control of the current value for driving the metering valve 18 by PID control in accordance with a deviation between the actual common rail pressure in the common rail 20 acquired from the pressure sensor 22 and the target common rail pressure set based upon the engine operation state.

(4) Drive Amount Control Section:

As described above, the ECU 40 stores the pumping quantity characteristic of the pumping quantity of the high-pressure pump 16 with respect to the duty ratio for controlling the current value for driving the metering valve 18 as the map in the ROM or the EEPROM. The ECU 40 senses the engine operation state from the sensing signals of the various sensors and sets the target common rail pressure suitable for the engine operation state. The ECU 40 controls the current value for driving the metering valve 18 to achieve the set target common rail pressure based upon the pumping quantity characteristic map and a learning value of the duty ratio for controlling the current value of the metering valve 18 learned by the learning section. The ECU 40 controls the current value of the metering valve 18 to control the pumping quantity of the high-pressure pump 16, thereby controlling the common rail pressure.

(5) Comparing Section:

When the ignition key is switched off to end the operation of the diesel engine 50 in a present trip, the ECU 40 compares an immediately preceding learning value of the current control value of the metering valve 18, which is learned by the PID control before the ignition key is switched off, with an average value of start timing learning values for controlling the current value of the metering valve 18 when the diesel engine 50 is started in a predetermined number of trips up to and including the present trip. More specifically, the ECU 40 determines whether a difference between the immediately preceding learning value of the present trip and the average value of the start timing learning values of the predetermined number of trips up to and including the present trip is within a predetermined range. The start timing learning values of the trips up to and including the present trip are stored in the rewritable nonvolatile memory such as the EEPROM.

The predetermined range used in the comparison between the immediately preceding learning value of the present trip and the average value of the start timing learning values of the predetermined number of trips up to and including the present trip should be preferably changed at each predetermined travel distance in consideration of degradation of the high-pressure pump 16 due to an aging change corresponding to the travel distance, for example.

(6) Learning Value Updating Section:

The ECU 40 does not update the start timing learning value to be used in an engine startup of a next trip if the difference between the immediately preceding learning value of the present trip and the average value of the start timing learning values of the predetermined number of trips up to and including the present trip exceeds the predetermined range. For example, in a case where the immediately preceding learning value of the present trip is excessively away from the average value of the start timing learning values in the predetermined number of trips up to and including the present trip due to an occurrence of an unexpected event specific to the present trip, the ECU 40 does not update the start timing learning value to be used in the engine startup of the next trip. For example, the ECU 40 uses the start timing learning value used at the engine startup of the present trip as the start timing learning value at the engine startup of the next trip.

In consequence, in a case where the unexpected event specific to the present trip has been solved by the time of the startup of the next trip, the immediately preceding learning value of the present trip is prevented from being used as the start timing learning value of the next trip. As a result, the pumping quantity of the high-pressure pump 16 at the startup of the next trip can be prevented from rapidly increasing or decreasing as compared to the pumping quantity at the startup of each of the trips up to and including the present trip.

The pressure of the fuel supplied to the injector 30 changes in accordance with the pumping quantity of the high-pressure pump 16. Therefore, by preventing the pumping quantity of the high-pressure pump 16 at the startup in the next trip from rapidly increasing or decreasing as compared to the pumping quantity at the startup of each of the trips up to and including the present trip, the injection pressure of the injector 30 in the next trip can be prevented from rapidly increasing or decreasing as compared to the injection pressure at the startup of each of the trips up to and including the present trip. Thus, the startup failure of the diesel engine 50 in the next trip can be inhibited and also deterioration of a combustion noise at the startup can be inhibited. Further, deterioration in smoke at the engine startup can be inhibited.

If the difference between the immediately preceding learning value of the present trip and the average value of the start timing learning values of the predetermined number of trips up to and including the present trip is within the predetermined range, the start timing learning value of the next trip is updated with the immediately preceding learning value of the present trip immediately after the ignition key is switched off.

Thus, the injection pressure of the injector in the next trip can be prevented from rapidly increasing or decreasing as compared to the injection pressure at the startup of each of the trips up to and including the present trip. In addition, the latest value of the immediately preceding learning value of the high-pressure pump 16 changing with aging or the like can be used to start the diesel engine 50 in the next trip. As a result, the startup failure of the diesel engine 50 in the next trip can be inhibited and the deterioration of the combustion noise at the startup can be inhibited. Further, the deterioration in smoke at the startup can be inhibited.

Figure 2:
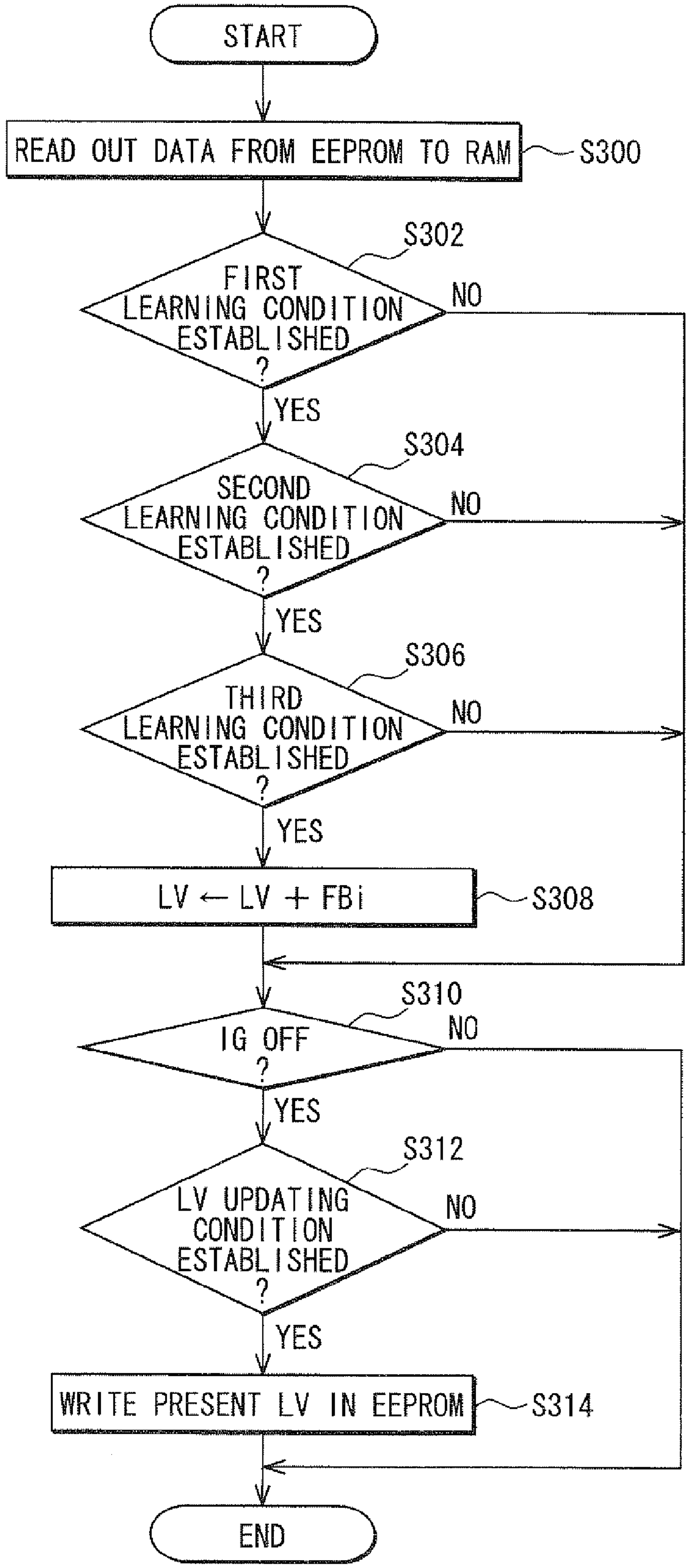
FIG. 2 is a flowchart showing a current value learning routine of a metering valve according to the first embodiment.

Next, current value learning of the metering valve 18 of the high-pressure pump 16 will be explained with reference to FIG. 2. In FIG. 2, "S" means a step. A current value learning routine shown in FIG. 2 is constantly executed during a trip from an operation start to an operation end of the diesel engine 50.

If the ignition key is switched on, in S300 the ECU 40 reads various control data from the EEPROM to the RAM, the control data including the start timing learning value. The ECU 40 controls the current value of the metering valve 18 with the read start timing learning value to control the pumping quantity of the high-pressure pump 16, thereby controlling the common rail pressure to pressure suitable for the engine startup.

The ECU 40 may execute S300 only once at the engine startup or every time. In S302, S304 and S306, the ECU 40 determines whether various learning execution conditions of the current value of the metering valve 18 described below are established. If it is determined that any of the learning execution conditions of S302, S304 and S306 is not established, the ECU 40 ends the present routine.

(1) S302:

The learning execution condition (i.e., first learning condition) is established when an integral term of the PID control for controlling the common rail pressure to the target common rail pressure is equal to or greater than a predetermined value.

(2) S304:

The learning execution condition (i.e., second learning condition) is established when an idling operation state lasts for at least a predetermined time (for example, two seconds).

(3) S306:

The learning execution condition (i.e., third learning condition) is established when all of following conditions (i) to (iii) last for at least a predetermined time (for example, five seconds).

(i) A deviation between the actual common rail pressure acquired from a sensing signal of the pressure sensor 22 and the target common rail pressure is less than a predetermined value.

(ii) The engine rotation speed is within a predetermined range.

(iii) Each of coolant temperature and fuel temperature is within a predetermined range and warming up of the engine has been completed.

In a case where all the learning execution conditions are established in S302, S304 and S306, the ECU 40 adds the integral term FBi of the PID control to the learning value LV to update the learning value LV of the current value of the metering valve 18 in S308.

The ECU 40 determines whether the ignition key is off (IG OFF) in S310. When it is determined that the ignition key is not off, the present routine is ended. When it is determined that the ignition key is off, the ECU 40 determines in S312 whether a condition for updating the start timing learning value for controlling the current value of the metering valve 18 at the engine startup in the next trip is established.

In the present embodiment, the learning value updated in S308 immediately before the ignition key is switched off is used as the immediately preceding learning value of the present trip. The immediately preceding learning value is compared with an average value of start timing learning values of a predetermined number of trips (five trips, for example) up to and including the present trip. The start timing learning values of the five trips up to and including the present trip are stored in the rewritable nonvolatile memory such as the EEPROM.

If the difference between the immediately preceding learning value of the present trip and the average value of the start timing learning values of the five trips up to and including the present trip exceeds the predetermined range in S312 (i.e., if it is not determined that the updating condition is established in S312), the ECU 40 ends the present routine without updating the start timing learning value to be used at the startup of the next trip. In this case, the ECU 40 uses the start timing learning value in the present trip as the start timing learning value at the engine startup of the next trip without change.

When the difference between the immediately preceding learning value of the present trip and the average value of the start timing learning values of the five trips up to and including the present trip is within the predetermined range in S312 (i.e., if it is determined that the updating condition is established in S312), the ECU 40 writes the immediately preceding learning value of the present trip in the EEPROM in S314 immediately after the ignition key is switched off and uses the immediately preceding learning value of the present trip as the start timing learning value at the engine startup of the next trip.

In place of determining the above-mentioned updating condition in S312, the immediately preceding learning value of the present trip updated in S308 immediately before the ignition key is switched off may be compared with an average value of immediately preceding learning values of a predetermined number of trips (for example five trips) up to and including the last trip as determination of the updating condition (as another updating condition) in S312. The immediately preceding learning values of the five trips up to and including the last trip are stored in the rewritable nonvolatile memory such as the EEPROM.

If the difference between the immediately preceding learning value of the present trip and the average value of the immediately preceding learning values of the five trips up to and including the last trip exceeds a predetermined range the ECU 40 ends the present routine without updating the start timing learning value to be used at the startup of the next trip. In this case, the ECU 40 uses the start timing learning value of the present trip as the start timing learning value at the engine startup of the next trip without change.

If the difference between the immediately preceding learning value of the present trip and the average value of the immediately preceding learning values of the five trips up to and including the last trip is within the predetermined range, the ECU 40 writes the immediately preceding learning value of the present trip as the start timing learning value at the engine startup of the next trip in the EEPROM in S314 immediately after the ignition key is switched off and ends the present routine.

When the average value of the immediately preceding learning values in the predetermined number of trips up to and including the last trip is calculated in S312, the ECU 40 may select immediately preceding learning values of trips, a difference of each of which from an average value of immediately preceding learning values of the predetermined number of immediately preceding trips is within a predetermined range, and may calculate an average value of the selected immediately preceding learning values as the average value to be used in the determination of the updating condition (as yet another updating condition). The immediately preceding learning values of the five trips up to and including the last trip selected for calculating the average value are stored in the rewritable nonvolatile memory such as the EEPROM.

Next, current value learning according to a second embodiment of the present invention will be explained with reference to FIG. 3. The construction of the fuel injection system other than the current value learning routine is substantially the same as the first embodiment.

Figure 3:
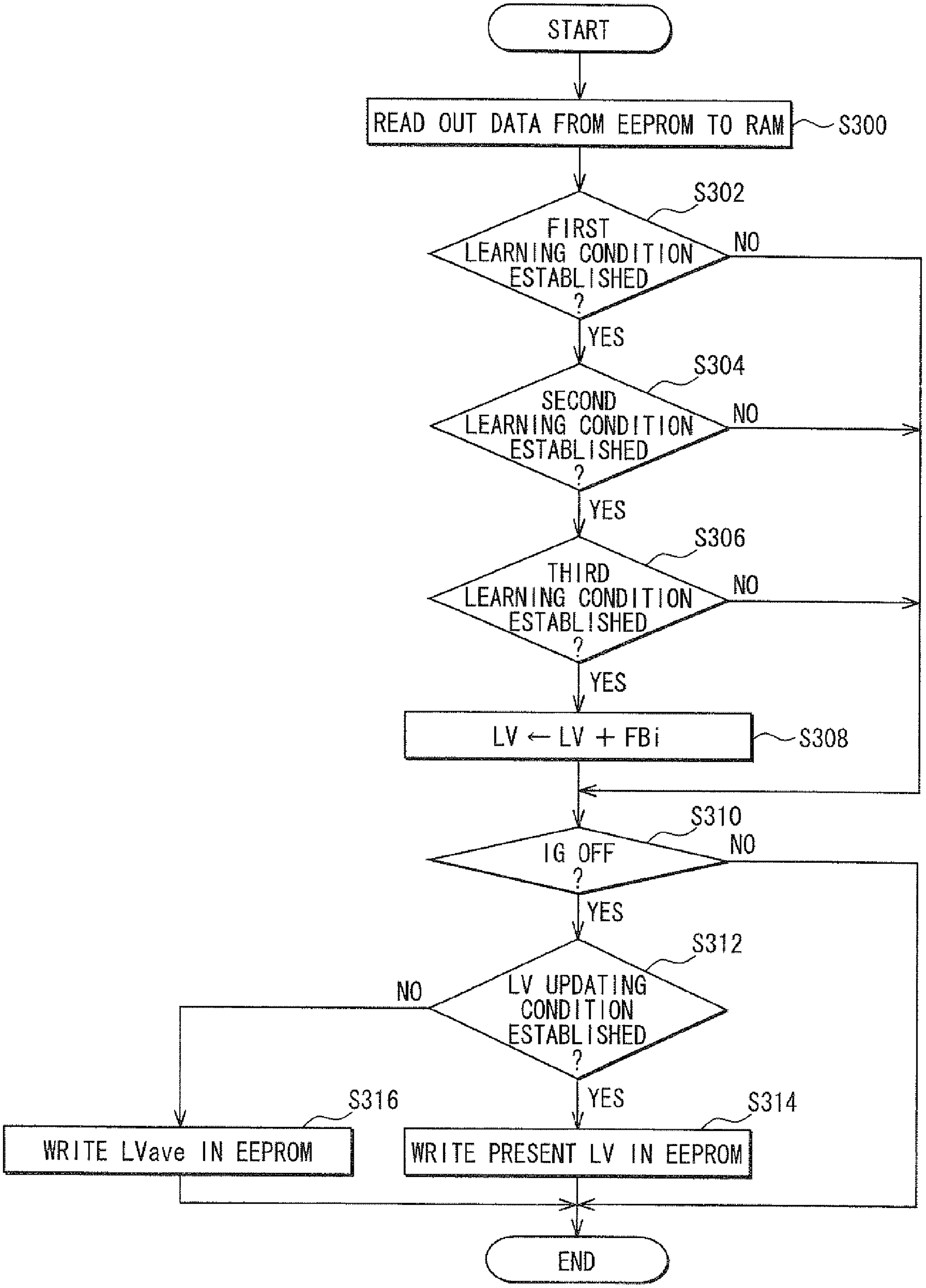
FIG. 3 is a flowchart showing a current value learning routine of a metering valve according to a second embodiment of the present invention.

Processing in S300 to S314 of the current value control routine shown in FIG. 3 is the same as the processing in S300 to S314 of the current value control routine according to the first embodiment shown in FIG. 2 and therefore, the explanation thereof is not repeated here.

In determination in S312, if the difference between the immediately preceding learning value of the present trip and the average value of the immediately preceding learning values of the five trips up to and including the last trip exceeds the predetermined range, the ECU 40 writes the average value LVave of the immediately preceding learning values of the five trips up to and including the last trip in S316 as the start timing learning value at the engine startup of the next trip and ends the present routine.

In the determination of the updating condition in S312 according to the second embodiment, the ECU 40 may select only immediately preceding learning values of trips, a difference of each of which from an average value of immediately preceding learning values of the predetermined number of immediately preceding trips is within a predetermined range, and calculate an average value of the selected immediately preceding learning values as in the case of the determination of the yet another updating condition described above.

As explained above, in the current value learning routine of the metering valve 18 according to each of the first and second embodiments of the present invention, the immediately preceding learning value of the present trip is not used unconditionally as the start timing learning value for controlling the current value of the metering valve 18 at the startup of the next trip. Rather, if the difference between the immediately preceding learning value of the present trip and the average value of the initial learning values of the predetermined number of trips up to and including the present trip or the average value of the immediately preceding learning values in the predetermined number of trips up to and including the last trip exceeds the predetermined range, the start timing learning value of the next trip is not updated or the start timing learning value of the next trip is updated with the average value of initial learning values or the immediately preceding learning values of the predetermined number of trips.

With such the construction, when the immediately preceding learning value of the present trip is excessively away from the average value of the initial learning values or the immediately preceding learning values of the predetermined number of trips because of an occurrence of an unexpected event specific to the present trip such as a sliding failure of the high-pressure pump 16 including the metering valve 18 or deterioration of fuel properties, the immediately preceding learning value of the present trip is prevented from being used as the start timing learning value at the startup of the next trip. By using the average value of the initial learning values or the immediately preceding learning values of the predetermined number of trips as the start timing learning value at the startup of the next trip, the startup failure at the next trip can be inhibited and the deterioration of the combustion noise at the startup can be inhibited. Further, the smoke deterioration at the startup can be inhibited.

If the difference between the immediately preceding learning value of the present trip and the average value of the initial learning values or the immediately preceding learning values of the predetermined number of trips is within the predetermined range, the immediately preceding learning value of the present trip is used as the start timing learning value at the startup of the next trip. Thus, the diesel engine 50 can be started in the next trip with the use of the immediately preceding learning value of the present trip as the latest learning value of the current control value of the metering valve 18 gradually changing due to the aging or the like. As a result the startup failure of the next trip can be inhibited and the deterioration of the combustion noise at the startup can be inhibited. Further, the smoke deterioration at the startup can be inhibited.

Next, current value learning according to a third embodiment of the present invention will be explained with reference to FIG. 4. The construction of the fuel injection system other than the current value learning routine is substantially the same as the first embodiment.

Figure 4:
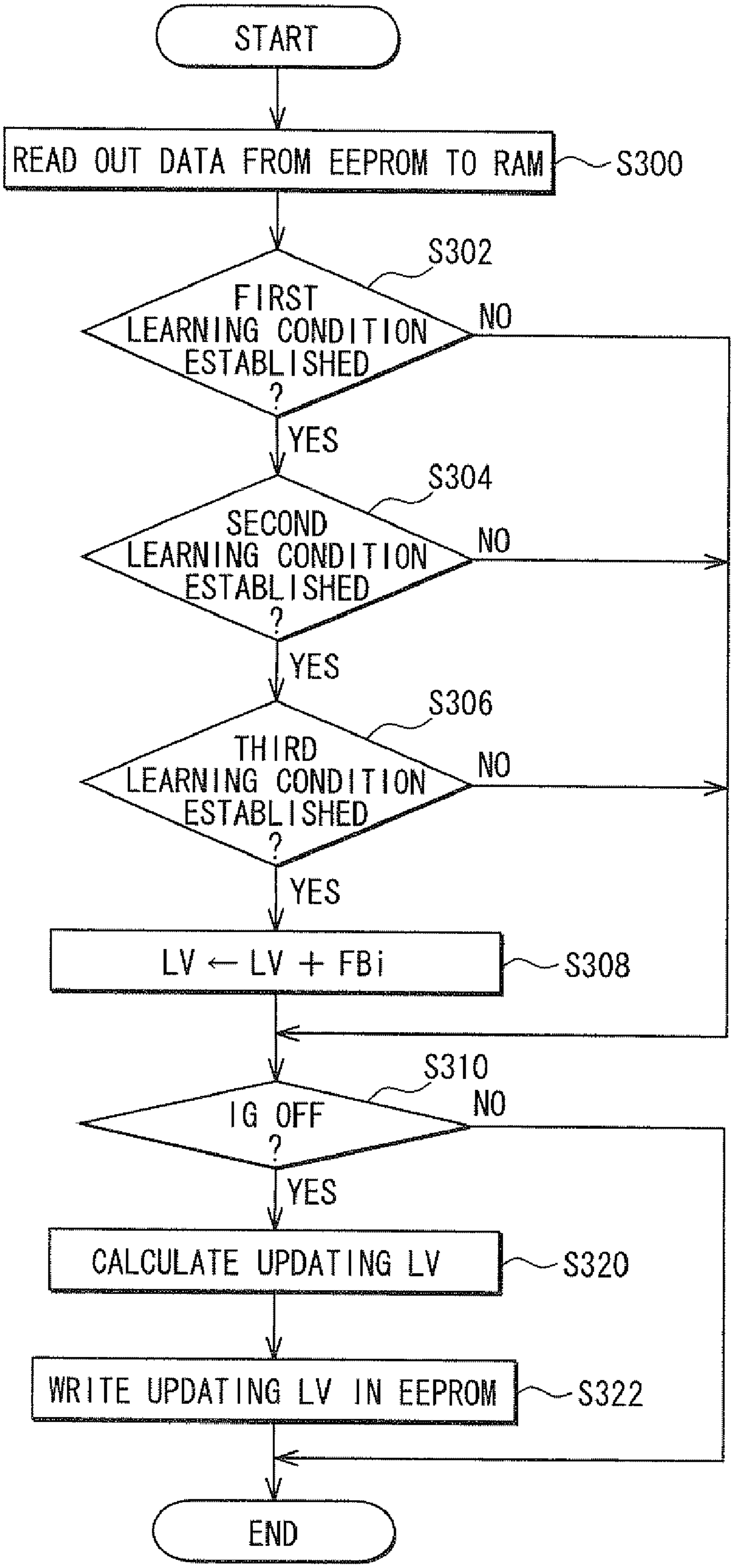
FIG. 4 is a flowchart showing a current value learning routine of a metering valve according to a third embodiment of the present invention.

The processing in S300 to S310 of the current value control routine shown in FIG. 4 is the same processing as the processing in S300 to S310 of the current value control routine shown in FIG. 2 and therefore, the explanation thereof is not repeated here.

In S320 of FIG. 4, the ECU 40 calculates an average value of the immediately preceding learning value of the present trip and the start timing learning values in multiple trips (for example five trips) up to and including the present trip as an updating learning value.

In S322, the ECU 40 updates the start timing learning value stored in the EEPROM with the updating learning value calculated in S320 and ends the present routine.

In the current value learning routine of the metering valve 18 according to the third embodiment, the immediately preceding learning value of the present trip is not used unconditionally as the start timing learning value for controlling the current value of the metering valve 18 at the startup of the next trip. Rather, the start timing learning value of the next trip is updated with the average value of the immediately preceding learning value of the present trip and the start timing learning values of the predetermined number of trips up to and including the present trip.

Thus, even if the immediately preceding learning value of the present trip is excessively away from the start timing learning values in the predetermined number of trips up to and including the present trip due to an occurrence of an unexpected event specific to the present trip, a rapid change of the start timing learning value to be used at the startup of the next trip can be prevented as compared to a case of updating the start timing learning value of the next trip with the immediately preceding learning value of the present trip. As a result, the injection pressure at the startup of the next trip of the diesel engine 50 can be prevented from rapidly increasing or decreasing as compared to the injection pressure at the startup of the diesel engine 50 in each of the trips up to and including the present trip. Accordingly, the startup failure of the diesel engine 50 in the next trip can be inhibited and also the deterioration of the combustion noise at the startup can be inhibited. Further, the smoke deterioration at the startup can be inhibited.

In the above description of the embodiments, the current value learning of the metering valve 18, which is arranged on the suction side of the high-pressure pump 16 and which adjusts the suction quantity to adjust the pumping quantity of the high-pressure pump 16, is explained. The arrangement position of the electromagnetic drive metering valve is not limited thereto. Alternatively, the metering valve may be arranged to any position in the fuel passage between a fuel inlet of the high-pressure pump and a fuel inlet of the injector. For example, the pumping quantity of the high-pressure pump may be adjusted by a metering valve arranged in the fuel passage on the pumping side of the pressurization chamber of the high-pressure pump or by a metering valve provided to the common rail.

While the invention has been described in connection with what is presently considered to be the most practical and preferred embodiments, it is to be understood that the invention is not to be limited to the disclosed embodiments, but on the contrary is intended to cover various modifications and equivalent arrangements included within the spirit and scope of the appended claims.

What is claimed is:

1. A fuel injection control device that adjusts a pumping quantity of a fuel supply pump with a metering valve, the fuel supply pump supplying fuel to an injector of an internal combustion engine, the fuel injection control device comprising:

a pressure acquiring means for acquiring pressure of the fuel supplied from the fuel supply pump to the injector;

a learning means for learning a drive amount for electromagnetically driving the metering valve based upon a deviation of actual fuel pressure, which is acquired by the pressure acquiring means, from target fuel pressure during one trip from an operation start to an operation end of the internal combustion engine;

a drive amount control means for controlling the drive amount based upon a learning value of the drive amount learned by the learning means;

a comparing means for comparing an immediately preceding learning value of the drive amount, which is learned under a learning condition immediately before an end of a present trip of the internal combustion engine, with an average value of the immediately preceding learning values in a predetermined number of trips up to and including the last trip; and a learning value updating means for updating a start timing learning value for controlling the drive amount at a startup of a next trip of the internal combustion engine with the average value when a difference between the immediately preceding learning value of the present trip and the average value exceeds a predetermined range and for updating the start timing learning value of the next trip with the immediately preceding learning value of the present trip when the difference between the immediately preceding learning value of the present trip and the average value is within the predetermined range.

2. The fuel injection control device as in claim 1, wherein the comparing means compares the immediately preceding learning value of the present trip with an average value of immediately preceding learning values in the predetermined number of trips, in which the start timing learning values are updated, among immediately preceding learning values of a plurality of trips up to and including the last trip.

3. The fuel injection control device as in claim 1, further comprising:

a learning condition determining means for using a state where the internal combustion engine is performing an idling operation as a learning condition for the learning means to learn the drive amount.

4. The fuel injection control device as in claim 1, wherein the fuel pumped by the fuel supply pump is accumulated in a common rail and is supplied to the injector, and the pressure acquiring means acquires pressure in the common rail as the fuel pressure.

5. A fuel injection system comprising:

a fuel supply pump having a metering valve for adjusting a pumping quantity of fuel pressurized and pumped by the fuel supply pump;

a common rail for accumulating the fuel pumped by the fuel supply pump;

an injector for injecting the fuel accumulated in the common rail to a cylinder of an internal combustion engine;

a fuel injection control device that adjusts the pumping quantity of the fuel supply pump with the metering valve, the fuel supply pump supplying fuel to the injector of the internal combustion engine, the fuel injection control device comprising:

a pressure acquiring means for acquiring pressure of the fuel supplied from the fuel supply pump to the injector;

a learning means for learning a drive amount for electromagnetically driving the metering valve based upon a deviation of actual fuel pressure, which is acquired by the pressure acquiring means, from target fuel pressure during one trip from an operation start to an operation end of the internal combustion engine;

a drive amount control means for controlling the drive amount based upon a learning value of the drive amount learned by the learning means;

a comparing means for comparing an immediately preceding learning value of the drive amount, which is learned under a learning condition immediately before an end of a present trip of the internal combustion engine, with an average value of the immediately preceding learning values in a predetermined number of trips up to and including the last trip; and a learning value updating means for updating a start timing learning value for controlling the drive amount at a startup of a next trip of the internal combustion engine with the average value when a difference between the immediately preceding learning value of the present trip and the average value exceeds a predetermined range and for updating the start timing learning value of the next trip with the immediately preceding learning value of the present trip when the difference between the immediately preceding learning value of the present trip and the average value is within the predetermined range; wherein the fuel pumped by the fuel supply pump is accumulated in a common rail and is supplied to the injector, and the pressure acquiring means acquires pressure in the common rail as the fuel pressure.

6. A fuel injection control device that adjusts a pumping quantity of a fuel supply pump with a metering valve, the fuel supply pump supplying fuel to an injector of an internal combustion engine, the fuel injection control device comprising:

a pressure acquiring means for acquiring pressure of the fuel supplied from the fuel supply pump to the injector;

a learning means for learning a drive amount for electromagnetically driving the metering valve based upon a deviation of actual fuel pressure, which is acquired by the pressure acquiring means, from target fuel pressure during one trip from an operation start to an operation end of the internal combustion engine;

a drive amount control means for controlling the drive amount based upon a learning value of the drive amount learned by the learning means;

a comparing means for comparing an immediately preceding learning value of the drive amount, which is learned under a learning condition immediately before an end of a present trip of the internal combustion engine, with an average value of the immediately preceding learning values in a predetermined number of trips up to and including the last trip; and a learning value updating means for updating a start timing learning value for controlling the drive amount at a startup of a next trip of the internal combustion engine with the immediately preceding learning value of the present trip when a difference between the immediately preceding learning value of the present trip and the average value is within a predetermined range, wherein the learning value updating means is prohibited from updating the start timing learning value of the next trip when the difference between the immediately preceding learning value of the present trip and the average value exceeds the predetermined range.

7. The fuel injection control device as in claim 6, wherein the comparing means compares the immediately preceding learning value of the present trip with an average value of immediately preceding learning values in the predetermined number of trips, in which the start timing learning values are updated, among immediately preceding learning values of a plurality of trips up to and including the last trip.

8. The fuel injection control device as in claim 6, further comprising:

a learning condition determining means for using a state where the internal combustion engine is performing an idling operation as a learning condition for the learning means to learn the drive amount.

9. The fuel injection control device as in claim 6, wherein the fuel pumped by the fuel supply pump is accumulated in a common rail and is supplied to the injector, and the pressure acquiring means acquires pressure in the common rail as the fuel pressure.

10. A fuel injection system comprising:

a fuel supply pump having a metering valve for adjusting a pumping quantity of fuel pressurized and pumped by the fuel supply pump;

a common rail for accumulating the fuel pumped by the fuel supply pump;

an injector for injecting the fuel accumulated in the common rail to a cylinder of an internal combustion engine; and a fuel injection control device that adjusts the pumping quantity of the fuel supply pump with the metering valve, the fuel supply pump supplying fuel to the injector of an internal combustion engine, the fuel injection control device comprising:

a pressure acquiring means for acquiring pressure of the fuel supplied from the fuel supply pump to the injector;

a learning means for learning a drive amount for electromagnetically driving the metering valve based upon a deviation of actual fuel pressure, which is acquired by the pressure acquiring means, from target fuel pressure during one trip from an operation start to an operation end of the internal combustion engine;

a drive amount control means for controlling the drive amount based upon a learning value of the drive amount learned by the learning means;

a comparing means for comparing an immediately preceding learning value of the drive amount, which is learned under a learning condition immediately before an end of a present trip of the internal combustion engine, with an average value of the immediately preceding learning values in a predetermined number of trips up to and including the last trip; and a learning value updating means for updating a start timing learning value for controlling the drive amount at a startup of a next trip of the internal combustion engine with the immediately preceding learning value of the present trip when a difference between the immediately preceding learning value of the present trip and the average value is within a predetermined range, wherein the learning value updating means is prohibited from updating the start timing learning value of the next trip when the difference between the immediately preceding learning value of the present trip and the average value exceeds the predetermined range; wherein the fuel pumped by the fuel supply pump is accumulated in a common rail and is supplied to the injector, and the pressure acquiring means acquires pressure in the common rail as the fuel pressure.

11. A fuel injection control device that adjusts a pumping quantity of a fuel supply pump with a metering valve, the fuel supply pump supplying fuel to an injector of an internal combustion engine, the fuel injection control device comprising:

a pressure acquiring means for acquiring pressure of the fuel supplied from the fuel supply pump to the injector;

a learning means for learning a drive amount for electromagnetically driving the metering valve based upon a deviation of actual fuel pressure, which is acquired by the pressure acquiring means, from target fuel pressure during one trip from an operation start to an operation end of the internal combustion engine;

a drive amount control means for controlling the drive amount based upon a learning value of the drive amount learned by the learning means;

a comparing means for comparing an immediately preceding learning value of the drive amount, which is learned under a learning condition immediately before an end of a present trip of the internal combustion engine, with an average value of start timing learning values for controlling the drive amount at startups of the internal combustion engine in a predetermined number of trips up to and including the present trip; and a learning value updating means for updating the start timing learning value of a next trip with the immediately preceding learning value of the present trip when a difference between the immediately preceding learning value of the present trip and the average value is within a predetermined range, wherein the learning value updating means is prohibited from updating the start timing learning value of the next trip when the difference between the immediately preceding learning value of the present trip and the average value exceeds the predetermined range.

12. The fuel injection control device as in claim 11, further comprising:

a learning condition determining means for using a state where the internal combustion engine is performing an idling operation as a learning condition for the learning means to learn the drive amount.

13. The fuel injection control device as in claim 11, wherein the fuel pumped by the fuel supply pump is accumulated in a common rail and is supplied to the injector, and the pressure acquiring means acquires pressure in the common rail as the fuel pressure.

14. A fuel injection system comprising:

a fuel supply pump having a metering valve for adjusting a pumping quantity of fuel pressurized and pumped by the fuel supply pump;

a common rail for accumulating the fuel pumped by the fuel supply pump;

an injector for injecting the fuel accumulated in the common rail to a cylinder of an internal combustion engine; and a fuel injection control device that adjusts a pumping quantity of the fuel supply pump with the metering valve, the fuel supply pump supplying fuel to the injector of the internal combustion engine, the fuel injection control device comprising:

a pressure acquiring means for acquiring pressure of the fuel supplied from the fuel supply pump to the injector;

a learning means for learning a drive amount for electromagnetically driving the metering valve based upon a deviation of actual fuel pressure, which is acquired by the pressure acquiring means, from target fuel pressure during one trip from an operation start to an operation end of the internal combustion engine;

a drive amount control means for controlling the drive amount based upon a learning value of the drive amount learned by the learning means;

a comparing means for comparing an immediately preceding learning value of the drive amount, which is learned under a learning condition immediately before an end of a present trip of the internal combustion engine, with an average value of start timing learning values for controlling the drive amount at startups of the internal combustion engine in a predetermined number of trips up to and including the present trip; and a learning value updating means for updating the start timing learning value of a next trip with the immediately preceding learning value of the present trip when a difference between the immediately preceding learning value of the present trip and the average value is within a predetermined range, wherein the learning value updating means is prohibited from updating the start timing learning value of the next trip when the difference between the immediately preceding learning value of the present trip and the average value exceeds the predetermined range; wherein the fuel pumped by the fuel supply pump is accumulated in a common rail and is supplied to the injector, and the pressure acquiring means acquires pressure in the common rail as the fuel pressure.

15. A fuel injection control device that adjusts a pumping quantity of a fuel supply pump with a metering valve, the fuel supply pump supplying fuel to an injector of an internal combustion engine, the fuel injection control device comprising:

a pressure acquiring means for acquiring pressure of the fuel supplied from the fuel supply pump to the injector;

a learning means for learning a drive amount for electromagnetically driving the metering valve based upon a deviation of actual fuel pressure, which is acquired by the pressure acquiring means, from target fuel pressure during one trip from an operation start to an operation end of the internal combustion engine;

a drive amount control means for controlling the drive amount based upon a learning value of the drive amount learned by the learning means; and a learning value updating means for updating a start timing learning value for controlling the drive amount at a startup of a next trip of the internal combustion engine with an average value of an immediately preceding learning value of the drive amount, which is learned under a learning condition immediately before an end of a present trip of the internal combustion engine, and start timing learning values for controlling the drive amount at startups of the internal combustion engine in a predetermined number of trips up to and including the present trip.

16. The fuel injection control device as in claim 15, further comprising:

a learning condition determining means for using a state where the internal combustion engine is performing an idling operation as a learning condition for the learning means to learn the drive amount.

17. The fuel injection control device as in claim 15, wherein the fuel pumped by the fuel supply pump is accumulated in a common rail and is supplied to the injector, and the pressure acquiring means acquires pressure in the common rail as the fuel pressure.

18. A fuel injection system comprising:

a fuel supply pump having a metering valve for adjusting a pumping quantity of fuel pressurized and pumped by the fuel supply pump;

a common rail for accumulating the fuel pumped by the fuel supply pump;

an injector for injecting the fuel accumulated in the common rail to a cylinder of an internal combustion engine; and a fuel injection control device that adjusts the pumping quantity of the fuel supply pump with the metering valve, the fuel supply pump supplying fuel to the injector of the internal combustion engine, the fuel injection control device comprising:

a pressure acquiring means for acquiring pressure of the fuel supplied from the fuel supply pump to the injector;

a learning means for learning a drive amount for electromagnetically driving the metering valve based upon a deviation of actual fuel pressure, which is acquired by the pressure acquiring means, from target fuel pressure during one trip from an operation start to an operation end of the internal combustion engine;

a drive amount control means for controlling the drive amount based upon a learning value of the drive amount learned by the learning means; and a learning value updating means for updating a start timing learning value for controlling the drive amount at a startup of a next trip of the internal combustion engine with an average value of an immediately preceding learning value of the drive amount, which is learned under a learning condition immediately before an end of a present trip of the internal combustion engine, and start timing learning values for controlling the drive amount at startups of the internal combustion engine in a predetermined number of trips up to and including the present trip; wherein the fuel pumped by the fuel supply pump is accumulated in a common rail and is supplied to the injector, and the pressure acquiring means acquires pressure in the common rail as the fuel pressure.

* * * * *